(12) United States Patent
Grueneberg et al.

(10) Patent No.: US 8,599,408 B2
(45) Date of Patent: Dec. 3, 2013

(54) PUBLISHING CONTENT TO SOCIAL NETWORK SITES FROM APPLICATIONS

(75) Inventors: Keith W. Grueneberg, Hawthorne, NY (US); Amy G. Katriel, Oakland, NJ (US); Lei Kuang, Ramsey, NJ (US); Mark K. Singley, Skillman, NJ (US)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 12/693,970

(22) Filed: Jan. 26, 2010

(65) Prior Publication Data
US 2011/0181906 A1 Jul. 28, 2011

(51) Int. Cl.
*G06F 3/12* (2006.01)
*G06F 15/00* (2006.01)
*G06K 1/00* (2006.01)

(52) U.S. Cl.
USPC .......................... 358/1.15; 358/1.9; 358/1.13

(58) Field of Classification Search
None
See application file for complete search history.

(56) References Cited

U.S. PATENT DOCUMENTS 6,839,743 B2 * 1/2005 Shim .............................. 709/217
6,992,782 B1 * 1/2006 Yardumian et al. ........... 358/1.13
2004/0120000 A1 * 6/2004 Onuma et al. ................ 358/1.14
2005/0262439 A1 * 11/2005 Cameron ........................ 715/523
2006/0092469 A1 * 5/2006 Fu et al. ......................... 358/1.15
2009/0055772 A1 * 2/2009 Huang ............................ 715/810
2010/0241623 A1 * 9/2010 Acker et al. .................... 707/724

OTHER PUBLICATIONS

"How to Upload Photos to Facebook from iPhone" dated Nov. 25, 2009 from Internet Archive <http://www.trickyways.com/2009/08/how-to-upload-photos-to-facebook-from-iphone/>.*
"Pixelpipe: Easily Share Your Media Files on Multiple Sites" published Aug. 19, 2008 <http://readwrite.com/2008/08/19/pixelpipe_easily_share_media_files>.*
WDK and Developer Tools, Microsoft Driver Kit, http://www.microsoft.com/whdc/DevTools/WDK/WDKpkg.mspx, Jan. 26, 2010.
WC3 Ubiquitous Web domain, Extensible Markup Language (XML), http://www.w3.org/XML/, Jan. 26, 2010.
ZAN Image Printer, ZAN Image Printer Features, http://www.zan1011.com/index.htm, Jan. 26, 2010.
Blog it!, Publish the Same Blog Post to Multiple Blogging Sites at Once, Oct. 14, 2008, http://www.labnol.org/internet/blogging/post-blog-entries-to-multiple-blogging-platforms/4943/.
Adobe Acrobat, http://www.adobe.com/, Jan. 26, 2010.

* cited by examiner

*Primary Examiner* — Ming Hon
(74) *Attorney, Agent, or Firm* — Scully, Scott, Murphy & Presser, P.C.; Daniel P. Morris, Esq.

(57) ABSTRACT

A device driver such as a print driver may be configured to a web site. A user may select a driver for sending and publishing data to a selected web site. The driver may automatically transform the content data, authenticates the user to the selected web site and send the data for publishing.

15 Claims, 4 Drawing Sheets

PUBLISHING CONTENT TO SOCIAL NETWORK SITES FROM APPLICATIONS

FIELD

The present disclosure is generally related to publishing content to social network sites from applications, for example, using a printer device driver.

BACKGROUND

Most social networking websites require the user to login to the site, and either upload files (e.g., pictures, documents) or input text directly on a web page in order to publish content. Often, users may post the same content to more than one site. While most sites (e.g., Facebook™ and Blogger™) offer an Application Programming Interface (API) where developers can create applications to share data or upload content, a tool should be available to make the publishing of content as easy as possible, given the emerging and prevalent use of such social networking websites.

Commands like the "Print" command exist in a standard Windows™ or other application that displays printable material. Usually, after the Print command is selected, a selection of printers is shown to the user. Each of these printers has a corresponding printer driver that is developed conforming to the specifications, for example, in the Microsoft™ Driver Kit for those operating in Windows™ environment. Normally, the printer driver contains instructions on formatting output so that it can be printed on the selected printer. The printer driver sends the output to the printer spooler so it can be sent to the printing device.

BRIEF SUMMARY

A method and system for publishing content to social network sites or the like from application program may be provided. The method in one aspect may include configuring a print driver to connect to a web site and enabling the print driver to transform data and send the data to the web site.

A method of publishing content to social network sites from an application program or the like, in another aspect, may include receiving a print command from an application and presenting a print driver to select for publishing to one or more social network sites. The method may also include receiving a selection of print driver, receiving data to be published, and sending the data by the selected printer driver to said one or more social network sites.

A system for publishing content to social network sites from an application program or the like, in one aspect, may include a printer driver configured to send data to one or more selected social networking web sites for publishing.

Further features as well as the structure and operation of various embodiments are described in detail below with reference to the accompanying drawings. In the drawings, like reference numbers indicate identical or functionally similar elements.

DETAILED DESCRIPTION

The present disclosure describes a system and method for using a device driver such as the printer driver or the like to publish content to one or more web sites. The system and method of the present disclosure in one aspect allow users to post content to one or more site using an existing command in a computer operating system or environment, such as the Print command in Windows™ applications. For example, when a user is viewing a photo using a tool such as Microsoft™ Photo Editor, the user may select File/Print on the menu and choose to print the photos to a social networking site such as Facebook™. The system and method of the present disclosure in one aspect may configure a print diver to know how to connect to the web site, authenticate, transform the data (if necessary), and publish the content.

Figure 1:
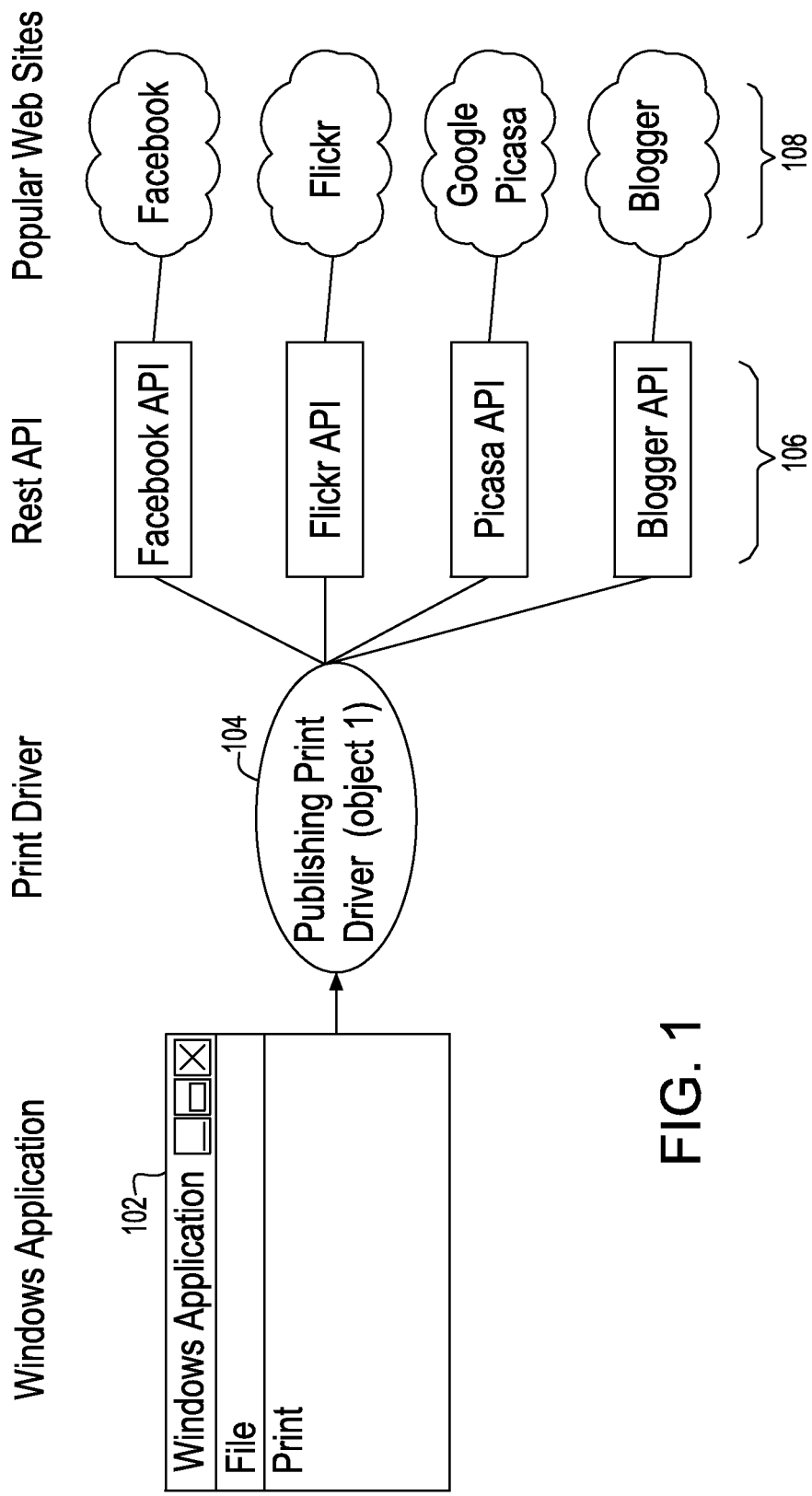
FIG. 1 is an architectural diagram showing examples of web sites that could be published to using a configurable universal driver.

FIG. 1 illustrates an example implementation of the multi-site publishing driver in one aspect. In one embodiment, a device driver referred to herein as a multi-site publishing driver, enables publishing content to multiple sites at one time. The driver may be configurable by the user and a user identifier and password is stored with the driver for each site. The following sequence of events for the publishing operation utilizes a print driver selected using a print command from an application and/or operating system environment. A Print Command is issued from an application such as a Windows™ application as shown at 102. A print driver configured as a multi-site publishing driver 104 is selected from the list of printers in the dialog box. A configuration screen opens where a user can enter parameters for publishing (e.g., photo caption). A multi-site publishing driver extracts the data to a file and sends commands to the spooler. A print processing routine (e.g., dynamic library routines such as dll) retrieves the commands and publishes the file or data using the API of the site 106 at the specified site 108.

In one aspect, authentication and publishing may be done in a format that is suitable for the REST API that the driver is calling. The file can be sent over the internet to the site, or, in the case of a blog, just the text may be extracted and published to the site. A multi-site driver can be configured with some existing sites such as Picasa™, Facebook™, and Blogger™. The driver may be configurable so that new sites can be added as needed.

Figure 2:
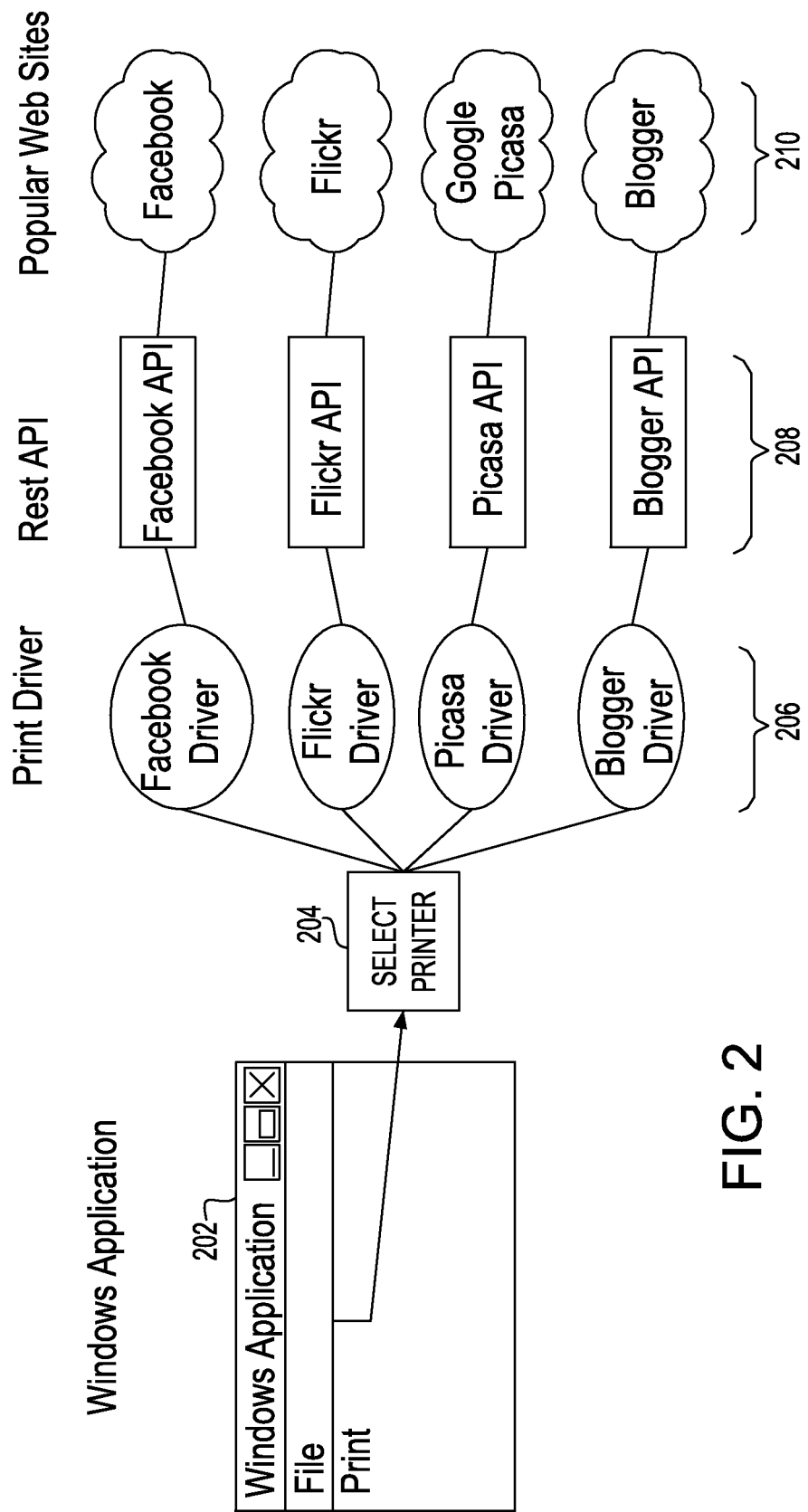
FIG. 2 is an architectural diagram showing examples of web sites that could be published to using a custom driver for each site.

FIG. 2 is an architectural diagram showing examples of web sites that could be published to using a custom driver for each site. In another embodiment, a publishing driver may be provided for each site. For example, a separate printer driver may provide a driver for each site. Each driver may include the specific configuration parameters needed for the site it will publish to. As in the multi-site publishing driver shown in FIG. 1, a Print Command may be issued from an application such as a Windows™ application as shown at 202. A specific site publishing driver may be selected as shown at 204 from a list of choices for selection, for example, shown at 206. Any other methods for selecting a specific driver may be utilized, for example, a user may input or type in a desired driver. A user may also enter parameters such as content for publishing. The selected specific publishing driver extracts the data to a file and sends commands to the spooler. A print processing routine (e.g., dynamic library routines such as dll) retrieves the commands and publishes the file or data using the API of the site 208 at the specified site 210.

Figure 3:
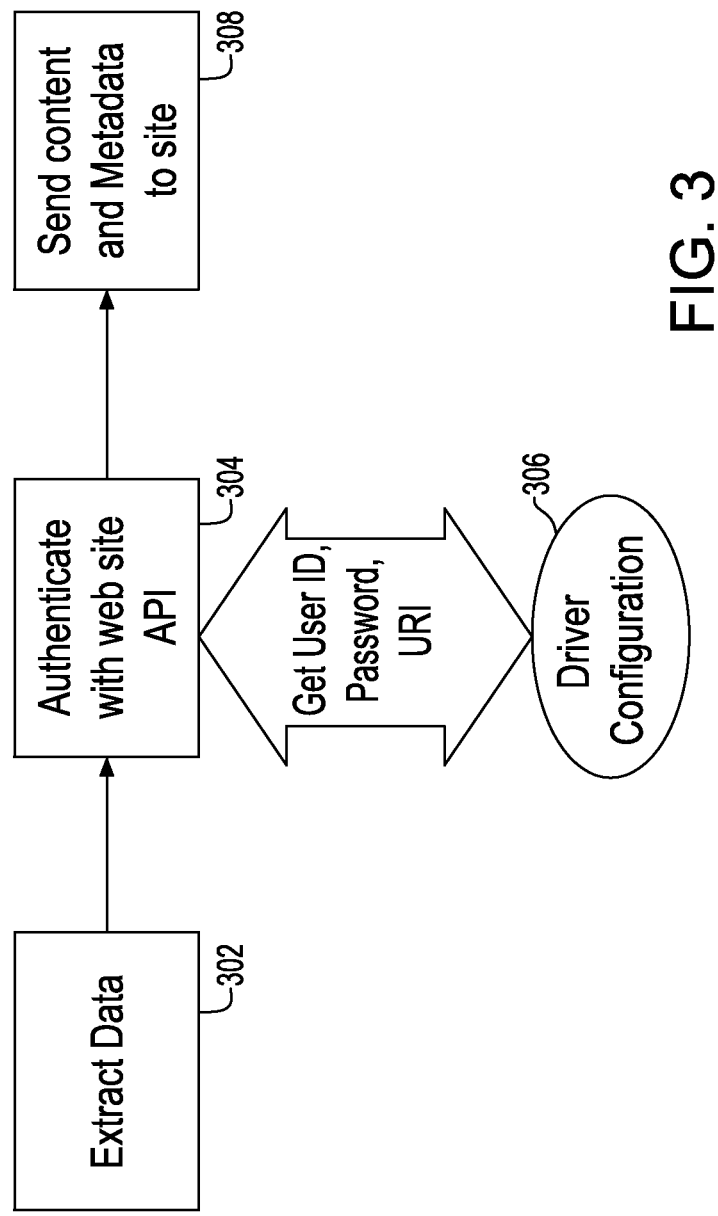
FIG. 3 shows a functional flow of a publishing print driver in one embodiment.

FIG. 3 shows a functional flow of a publishing device driver in one embodiment. As described above, the publishing device driver may be a printer driver configured to output data to a specific web site, for instance, utilizing associated application programming interfaces. At 302, data to publish is extracted. At 304, the user is authenticated with the web site. This may be performed by extracting the user credentials saved in the driver configuration at 306. At 308, the content is sent to the web site.

The implementation of a device driver may vary with each operating system. In Microsoft™ Windows™, drivers are created using the Windows™ Driver Kit (WDK). The driver kit contains detailed instructions on how to develop Windows™ drivers that conform to the specification. By customizing the sample drivers that are provided by Microsoft™, a developer can create a printer driver that performs operations other than sending output to a printer. In an aspect of the present disclosure, the printer interface dll (Dynamic Link Library) is modified to create a custom print property page for driver configuration. For the Specialized Publishing Driver shown in FIG. 2, the property page may include attributes such as the user name, password, and command specific to each site (e.g. "New Post", "Upload Photo"). For the multi-site publishing driver shown in FIG. 1, the property page may include checkboxes for each site to publish to (e.g., Facebook™, Blogger™, Twitter™), and each site may have tabs (e.g., separate page) for specific parameters needed to publish. The print processor dynamic link library (dll) may be modified to provide custom commands to format the data. The data may be formatted to the site's specification. The printer processor may include a command to send the data to the server URI (Universal Resource Identifier) provided in the printer property page.

In the case of the multi-site publishing driver, several sites may be published to at one time. The format for publishing may be different for each site, and each site's format may be programmed into the driver. The API (Application Programming Interface) command to send the data to the servers may be also different for each site, and the specific site API code may be provided in the driver.

For example, the below list an example XML format to post a new blog to Blogger™:

```
<?xml version="1.0"?>
<methodCall>
    <methodName>blogger.newPost</methodName>
    <params>
        <param><value><string>appkey</string></value></param>
        <param><value><string>blogid</string></value></param>
        <param><value><string>userid/string></value></param>
        <param><value><string>password</string></value></param>
        <param><value><string>content</string></value></param>
        <param><value><boolean>publish</boolean></value></param>
    </params>
</methodCall>
```

In the case of the specialized publishing driver (object 2), the publishing driver may only include the commands and format necessary to print to a specific site.

If the printer driver is developed according to the specifications of the operating system, when installed it will look like any other device available for printing.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
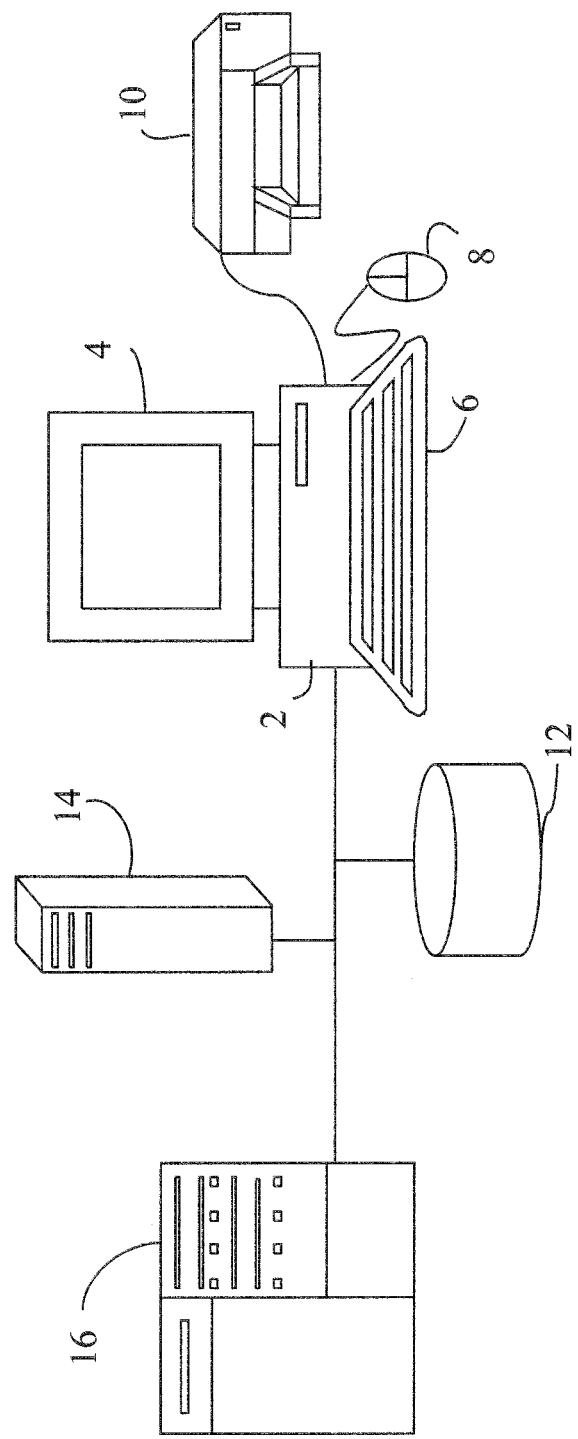
FIG. 4 illustrates an example of a computer system, in which the systems and methodologies of the present disclosure may be carried out or executed.

Referring now to FIG. 4, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for publishing content to social network sites from application program, comprising:
    configuring a print driver to connect to a web site; and
    enabling the print driver to transform data and send the data to the web site for publishing on a social network site directly from the application program,
    wherein the print driver is an operating system print driver for outputting data to a printer supported by the operating system, and wherein the printer driver is invoked automatically in response to receiving a print command, and
    wherein the print driver comprises specialized publishing driver specific to the social network site specifying user name, password, one or more commands specific to the social network site, the data being transformed based on the social network site's formatting specification, wherein in response to determining that the social network site is a blog site, only text content is extracted automatically from the application program for publishing to the site.

2. The method of claim 1, further including:
    enabling the print driver to authenticate to the web site.

3. The method of claim 1, wherein the print driver is enabled to send the data to the web site using an application interface program of the web site.

4. The method of claim 1, wherein the print driver is enabled to send the data to multiple sites at one time, wherein the print driver comprises the specialized publishing driver specific to each of the multiple sites.

5. The method of claim 1, wherein the printer driver is enabled to send the data to a specific site.

6. A method of publishing content to social network sites from an application program, comprising:
    receiving a print command from an application;
    presenting a print driver to select for publishing to one or more social network sites in response to receiving the print command directly from the application program,
    wherein the print driver is an operating system print driver for outputting data to a printer supported by the operating system;
    receiving a selected printer driver;
    receiving data to be published; and
    sending the data by the selected printer driver to said one or more social network sites,
    wherein the print driver comprises specialized publishing driver specific to the social network site specifying user name, password, one or more commands specific to the social network site, the data being transformed based on the social network site's formatting specification, wherein in response to determining that the social network site is a blog site, only text content is extracted automatically from the application program for publishing to the blog site.

7. The method of claim 6, wherein the sending the data by the selected printer driver includes the extracting the data to a file and sending a command to a spooler by the selected printer driver, and a print processing library function retrieving the command and publishing the file using an application program interface associated with said one or more social network sites.

8. The method of claim 6, further including receiving one or more social network sites to which publish the data.

9. A system for publishing content to social network sites from an application program, comprising:
    a processor;
    a printer driver configured to send data to one or more selected social networking web sites for publishing directly from the application program,
    wherein the print driver is an operating system print driver for outputting data to a printer supported by the operating system, and wherein the printer driver is invoked automatically in response to receiving a print command,
    wherein the print driver comprises specialized publishing driver specific to the social network site specifying user name, password, one or more commands specific to the social network site, the data being transformed based on the social network site's formatting specification, wherein in response to determining that the social network site is a blog site, only text content is extracted automatically from the application program for publishing to the blog site.

10. The system of claim 9, wherein the printer driver is operable to extract the data to a file and send a command to a spooler, wherein a print processing function retrieves the command and publishes the file using an application program interface associated with the one or more selected social networking web sites.

11. A non-transitory computer readable storage medium storing a program of instructions executable by a machine to perform a method of publishing content to social network sites from application program, comprising:
    configuring a print driver to connect to a web site; and
    enabling the print driver to transform data and send the data to the web site for publishing on a social network site directly from the application program,
    wherein the print driver is an operating system print driver for outputting data to a printer supported by the operating system, and wherein the printer driver is invoked automatically in response to receiving a print command,
    wherein the print driver comprises specialized publishing driver specific to the social network site specifying user name, password, one or more commands specific to the social network site, the data being transformed based on the social network site's formatting specification, wherein in response to determining that the social network site is a blog site, only text content is extracted automatically from the application program for publishing to the blog site.

12. The computer readable storage medium of claim 11, further including:

enabling the print driver to authenticate to the web site.

13. The computer readable storage medium of claim 11, wherein the print driver is enabled to send the data to the web site using an application interface program of the web site.

14. The computer readable storage medium of claim 11, wherein the print driver is enabled to send the data to multiple sites at one time, wherein the print driver comprises the specialized publishing driver specific to each of the multiple sites.

15. The computer readable storage medium of claim 11, wherein the printer driver is enabled to send the data to a specific site.

\* \* \* \* \*